United States Patent [19]

Schädel

[11] 4,254,792
[45] Mar. 10, 1981

[54] DOUBLE-SEAT VALVE

[75] Inventor: Hermann Schädel, Ergste, Fed. Rep. of Germany

[73] Assignee: Holstein & Kappert GmbH, Dortmund-Wambel, Fed. Rep. of Germany

[21] Appl. No.: 65,396

[22] Filed: Aug. 9, 1979

[30] Foreign Application Priority Data

Aug. 26, 1978 [DE] Fed. Rep. of Germany ....... 2837298

[51] Int. Cl.³ ............................................. F16K 1/00
[52] U.S. Cl. .............................. 137/240; 137/614.16; 251/334
[58] Field of Search ...................... 137/614.11, 614.13, 137/614.17, 614.18, 240, 313, 614.16; 251/334, 157, 84, 85, 211

[56] References Cited

U.S. PATENT DOCUMENTS

| 877,865 | 1/1908 | Ricksecker, Jr. | 251/334 |
| 1,654,516 | 12/1927 | Wilson | 251/334 |
| 2,741,264 | 4/1956 | Leonard | 251/334 |

FOREIGN PATENT DOCUMENTS

| 855183 | 7/1949 | Fed. Rep. of Germany . |
| 1675575 | 12/1970 | Fed. Rep. of Germany .......... 251/334 |
| 2416071 | 10/1974 | Fed. Rep. of Germany .......... 251/334 |
| 2609791 | 9/1977 | Fed. Rep. of Germany .......... 137/240 |
| 2623301 | 12/1977 | Fed. Rep. of Germany .......... 137/240 |
| 2632587 | 8/1977 | Fed. Rep. of Germany . |

Primary Examiner—Martin P. Schwadron
Assistant Examiner—A. Michael Chambers
Attorney, Agent, or Firm—Michael J. Striker

[57] ABSTRACT

A double-seat valve has a first valve member and a second valve member which abut against one another after a predetermined stroke to an open position, so as to form a closed chamber. A draining conduit communicates with the thus-formed chamber. The valve members are mounted on a common shaft. One of the valve members is variable so that its seating face is displaceable relative to a point in which this valve member is mounted on the common shaft. The one valve member may be elastically deformable or corrugated.

7 Claims, 3 Drawing Figures

DOUBLE-SEAT VALVE

BACKGROUND OF THE INVENTION

The present invention relates to a double-seat valve having two valve discs which move independently of and relative to one another.

Double-seat valves with independently movable valve discs are known in the art, in which after a predetermined stroke to an open position, one of the valve disc lies against the other valve disc and together with the latter forms a hollow chamber from which a draining conduit leads outside of the valve. Double-seat valves are utilized in beverages industry. When the valve discs are in the above-mentioned open position, the hollow chamber communicates with the draining conduit which has an outlet portion spaced from the valve seat and leading outside. In such a construction leakage of a valve can be fast detected due to outwardly flowing leakage liquid and can be eliminated before further damages occur.

With growing automation, a limit switch between the valve discs is provided for detecting respective positions of the valve discs, and the thus-obtained impulses are transmitted to a light screen which represents in a simple manner the respective closed and open positions of complete valve batteries. In this connection, the valves can operate with a guaranteed stroke. This means that a prestroke of the first valve disc which is moved by a control device, automatically drives the second valve disc, with interposition of an intermediate spring in some cases. Such a valve is disclosed, for example, in the German Pat. Nos. 855,183 and 2,632,587. These valves have, however, the disadvantage in that the second valve discs must be movably guided relative to the first valve disc on its own valve shaft in axial direction. Thereby, a complicated sealing is required, on the one hand, and a split cross-section takes place which is very disadvantageous, especially on hygienic grounds, in the beverages industry and is, therefore, undesirable. Moreover, pressure springs must be utilized for bridging of the intermediate strokes. Such valves have considerable total height which is disadvantageous when the valves are arranged in tank batteries wherein at least several valves must be located laterally adjacent to one another or one above the other. A further disadvantage is connected with fatigue of the pressure springs which occurs in these valves. After a certain period of use, leakage resulting from the insufficiently closed valve takes place, before it is visibly broken.

SUMMARY OF THE INVENTION

Accordingly, it is an object of the present invention to provide a double-seat valve which avoids the disadvantages of the prior art.

More particularly, it is an object of the present invention to provide a double-seat valve which operates reliably and at the same time does not require an additional shaft which must be guided on a main shaft and sealed.

Another object of the present invention is to provide a double-seat valve in which a second valve disc after a predetermined partial stroke drives a first valve disc and synchronization is guaranteed without the above-mentioned additional shaft-guiding elements.

In keeping with these objects and with others which will become apparent hereinafter, one feature of the present invention resides, briefly stated, in a double-seat valve in which one valve member is fixedly mounted on a shaft of another valve member and is variable so that its seating face is displaceable relative to a point in which the one valve member is mounted on the shaft. The seating face of the one valve member is displaceable and occupies different locations in an operative position and an inoperative position, as well as in an open position and a closed position.

In accordance with another feature of the present invention, the one valve member is formed as an elastic element. Advantageously, it may be formed as a cup spring. Instead of this, it also may be formed as corrugated tubular element.

Essential advantages are attained in accordance with the invention as compared with the known double-seat valves. An additional shaft is not utilized in the inventive double-seat valve, and seals and annular slots can be omitted. In connection with this, a limit switch for retransmission of position-indicating purposes to a light screen may be utilized in the inventive valve. Generally speaking, the inventive double-seat valve eliminates the above-mentioned disadvantages of the known double-seat valves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
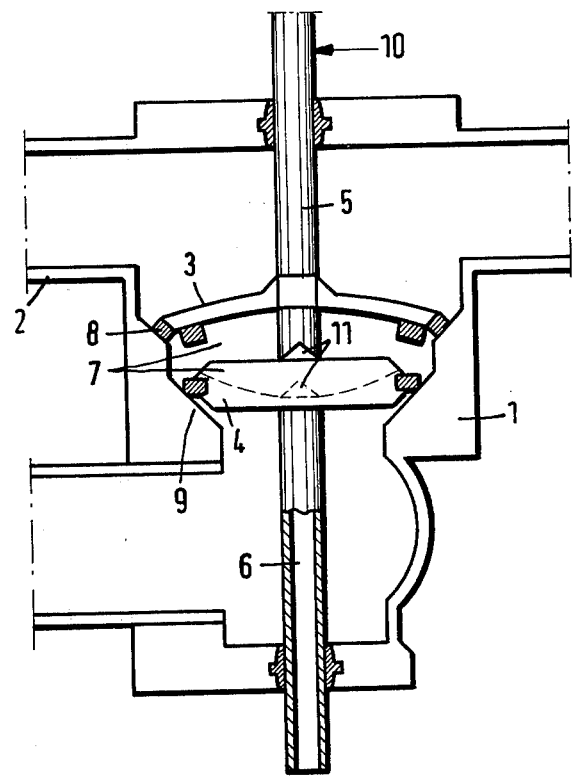
FIG. 1 is a view showing a section of a double-seat valve in accordance with the present invention.

A double-seat valve in accordance with the present invention is shown in FIG. 1 and has a housing 1. The housing 1 can be formed as a multiway distributor and has several schematically shown conduits 2 for a supply system. Two valve discs 3 and 4 are located in the interior of the housing 1.

The valve disc 4 which is a lower disc in the drawing, is connected with a shaft 5. The latter is remotely controlled by a not shown control arrangement in accordance with a predetermined program. A valve disc 3 which is an upper disc in the drawing, is also connected with the shaft 5. Both valve discs 3 and 4 have seating faces arranged oppositely to each other. These seating faces close a hollow chamber which is provided with an outlet opening 6 for draining a fluid outwardly. The valve discs 3 and 4 form the hollow chamber 7 both in the closed position and in the open position.

Figure 2:
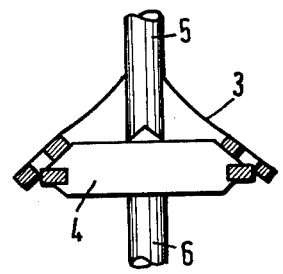
FIGS. 2 and 3 are views showing different embodiments of an elastic valve member of the inventive double-seat valve.
Figure 3:
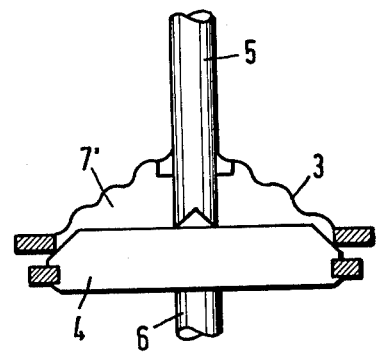

As can be seen from FIGS. 1-3, the upper valve disc 3 is formed by an elastic element whose body can be deformed relative to the mounting point, in the direction of elongation of the shaft 5 upwardly and downwardly. This relative displaceability is attained by forming the valve disc 3 elastic, similarly to a cup or disc spring, or to a spring element of corrugated tube type. Other constructions of the elastic valve disc 3 are also possible and lie within the limits of the present invention. For example, the valve disc 3 may be constituted of a synthetic plastic material which is resistant to aggressive media and provided with embedded spring elements.

Since the valve disc 3 is elastic, it elastically deforms when it moves between an inoperative position and an operative position, and also when it moves between an open position and a closed position. Thereby, the seating face of the valve disc 3 occupies different locations relative to the mounting point, or more particularly, to the point in which the valve disc 3 is mounted on the shaft 5.

In the closed position of the double-seat valve, shown for example in FIG. 1, the upper valve disc 3 abuts against a seat 8, whereas the lower valve disc 4 abuts against a seat 9 formed in the housing. As soon as the lower valve disc 4 is raised from its seat 9, the elastic upper valve disc 3 remains so long in its closed position until its inner seating face lies against the valve disc 4 and thereby forms its lower abutment. Both valve discs form in this position the hollow chamber 7 into which liquid accommodated in the supply system cannot flow. This position of the valve disc 3 is shown in FIG. 2. The thus-formed hollow chamber also communicates with a draining opening 6.

The dimension of the elastic valve disc 3 is so selected that when it abuts against the lower valve disc 4 and thereby assumes inclined position, it is sufficiently supported on its seat. Sliding off of the valve disc 3 into the cylindrical region immediately above the second valve seat 9 is thereby prevented.

When the double-seat valve is provided with the elastic valve disc 3, a cleaning liquid conduit can be connected in a simple manner at the height of arrow 10, with an upper portion of the valve shaft 5 which is hollow in this case. The cleaning liquid conduit can terminate in the region of the chamber 7 below the upper valve disc 3. Liquid can further flow through flow guiding openings so as to spray against the entire inner wall of the hollow chamber 7. Flowing out of the cleaning liquid may also be performed through schematically shown openings 11. The supply of cleaning liquid through the shaft 5 is advantageous in view of omission of a second shaft in that the annular gaps between the shafts and the respectively arranged seals can be eliminated.

The construction of the valve disc 3 can also be such that the sealing element connected with the same is elastically deformable to a normal extent. In such a case when the second valve disc 4 raises, the sealing element of the first valve disc 3 first abuts against the second valve disc 4 so as to form the closed hollow chamber whereby no liquid can enter the latter. During the further lifting of the shaft 5, the sealing element raises from the seat 8.

It will be understood that each of the elements described above, or two or more together, may also find a useful application in other types of constructions differing from the types described above.

While the invention has been illustrated and described as embodied in a double-seat valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A double-seat valve, comprising a housing, a movable shaft; means forming a first and second valve seat in said housing; one valve member fixedly mounted on said shaft in one mounting point; another valve member fixedly mounted also on said shaft in another mounting point and having a sealing element which forms a seating face arranged to abut against said first valve seat when said shaft together with said valve members moves to a closed position and to be lifted from said first valve seat when said shaft together with said valve members moves to an open position of the valve, said other valve member being movable independently of and relative to said one valve member and being variable so that said seating face of said other valve member is displaceable relative to the other mounting point and abuts against said one valve member to thereby form a hollow chamber between said valve members, said sealing element of said other valve member being so deformable that after a predetermined stroke of said other valve member in one direction, said seating face of said other valve member first abuts against said one valve member to thereby form said hollow chamber between said valve members, and thereafter said other valve member and said one valve member are lifted from said first and second valve seat respectively; and a draining conduit communicating with said hollow chamber prior to the valve members being lifted toward said open position so that fluid leaking into said chamber flows out of the latter outwardly of the valve.

2. A double-seat valve as defined in claim 1; and further comprising means forming a further valve seat on said other valve member, said one valve member having a further sealing element including a seating face arranged to abut against said further valve seat in a hollow chamber forming position of the valve, said other valve member seating face including a portion abutting against said one valve member in said open position.

3. A double-seat valve as defined in claim 1, wherein said other valve member is formed as an elastic element.

4. A double-seat valve as defined in claim 1, wherein said other valve member is formed as a corrugated tubular element.

5. A double-seat valve as defined in claim 1, wherein said other valve member is formed as a cup spring.

6. A double-seat valve as defined in claim 1, wherein said hollow chamber has inlet means operative for feeding a cleaning liquid into said hollow chamber so as to clean the latter.

7. A double-seat valve as defined in claim 6, wherein said shaft is hollow and has a cleaning fluid conduit to thereby form said inlet means.

* * * * *